(12) United States Patent
Huang

(10) Patent No.: US 10,273,126 B1
(45) Date of Patent: Apr. 30, 2019

(54) CORD PROTECTOR

(71) Applicant: Comeup Industries Inc., Taipei (TW)

(72) Inventor: Shih-Jyi Huang, Taipei (TW)

(73) Assignee: Comeup Industries Inc., Taipei (TW)

( * ) Notice: Subject to any disclaimer, the term of this patent is extended or adjusted under 35 U.S.C. 154(b) by 0 days.

(21) Appl. No.: 15/795,295

(22) Filed: Oct. 27, 2017

(51) Int. Cl.
| | |
|---|---|
| *B66D 1/28* | (2006.01) |
| *F16F 1/37* | (2006.01) |
| *A44B 19/36* | (2006.01) |
| *F16F 1/373* | (2006.01) |

(52) U.S. Cl.
CPC ............. *B66D 1/28* (2013.01); *F16F 1/373* (2013.01); *B66D 2700/0183* (2013.01)

(58) Field of Classification Search
CPC .... B66D 1/28; B66D 2700/0183; B66D 1/34; B66D 1/36; B66D 1/54; F16F 1/373; F16G 11/00; F16G 11/14; A44B 19/36
See application file for complete search history.

(56) References Cited

U.S. PATENT DOCUMENTS

| | | | | |
|---|---|---|---|---|
| 189,274 | A * | 4/1877 | Smith ..................... | F16G 11/06 24/135 R |
| 2,066,049 | A * | 12/1936 | Passek ................... | D06F 53/04 24/134 R |
| 2,592,696 | A * | 4/1952 | Hoody .................. | A63H 33/00 24/115 F |
| 2,877,527 | A * | 3/1959 | Bond ...................... | A47H 3/08 24/115 H |
| 3,315,914 | A * | 4/1967 | Turner ................... | B61B 12/10 242/390.1 |
| 3,399,433 | A * | 9/1968 | Faulkner ................ | F16G 11/14 403/211 |
| 3,540,083 | A * | 11/1970 | O'Connor .............. | F16G 11/10 114/230.26 |
| 3,897,161 | A * | 7/1975 | Reinwall, Jr. ......... | F16G 11/103 24/115 R |
| 3,965,544 | A * | 6/1976 | Boden ................... | F16G 11/101 24/136 R |
| 4,049,357 | A * | 9/1977 | Hamisch, Jr. .......... | F16G 11/02 16/444 |
| 5,008,981 | A * | 4/1991 | Smithson ............. | A41D 25/022 24/115 G |

(Continued)

*Primary Examiner* — Bradley T King
*Assistant Examiner* — James K Hsiao
(74) *Attorney, Agent, or Firm* — Alan D. Kamrath; Kamrath IP Lawfirm, P.A.

(57) ABSTRACT

A cord protector is combined with a cord to protect the cord. An outermost end head of the cord would revolve and is fixedly connected to the cord through a collar. The cord protector is assembled by a first protection seat and a second protection seat. The first protection seat and the second protection seat are made of flexible material resisting impact. Openings at the bottom of the first protection seat and the second protection seat co-clamp the cord. A top portion of the first protection seat is divided into two through grooves by a cross bar. Two side cord bodies of a revolving combination place of the cord respectively enter the two through grooves of the first protection seat and are joined by joining members. With the composition, it prevents collision between combined rigid components to protect the combined rigid components and operating users, thereby increasing use safety.

8 Claims, 10 Drawing Sheets

(56) References Cited

U.S. PATENT DOCUMENTS

| | | | | |
|---|---|---|---|---|
| 5,283,930 A * | 2/1994 | Krauss | F16G 11/101 | 24/129 R |
| 5,311,909 A * | 5/1994 | Adcock | A62C 33/04 | 137/899 |
| 5,572,770 A * | 11/1996 | Boden | F16G 11/101 | 24/136 R |
| 5,575,424 A * | 11/1996 | Fleischmann | E03C 1/04 | 137/218 |
| 5,644,821 A * | 7/1997 | Zaguroli, Jr. | B66D 3/24 | 24/114.5 |
| 5,671,508 A * | 9/1997 | Murai | F16G 11/101 | 24/115 K |
| 5,771,934 A * | 6/1998 | Warshawsky | E03C 1/0401 | 137/801 |
| 5,871,199 A * | 2/1999 | Koike | F16F 1/3732 | 248/615 |
| 6,250,338 B1 * | 6/2001 | Dempsey | E03C 1/04 | 137/801 |
| 6,618,910 B1 * | 9/2003 | Pontaoe | F16G 11/14 | 24/115 H |
| 7,094,251 B2 * | 8/2006 | Bonutti | A61B 17/0487 | 606/232 |
| 7,143,780 B1 * | 12/2006 | Pitts | F16K 27/12 | 137/382 |
| 9,528,250 B2 * | 12/2016 | Nelson | E03C 1/04 | |
| 2008/0023899 A1 * | 1/2008 | Hasegawa | F16F 7/108 | 267/141.1 |
| 2009/0145492 A1 * | 6/2009 | Thomas | E03C 1/04 | 137/355.23 |
| 2011/0001437 A1 * | 1/2011 | Marcaccio | F21V 33/0064 | 315/294 |
| 2012/0160985 A1 * | 6/2012 | Pollet | F16F 1/025 | 248/636 |
| 2012/0181122 A1 * | 7/2012 | Senecal | B66D 1/54 | 188/65.1 |
| 2013/0185900 A1 * | 7/2013 | Campbell | F16G 11/101 | 24/301 |
| 2017/0108080 A1 * | 4/2017 | Wheelwright | F16G 11/044 | |
| 2017/0227089 A1 * | 8/2017 | Costa | F16G 11/146 | |

\* cited by examiner

CORD PROTECTOR

BACKGROUND OF THE INVENTION

Field of the Invention

The present invention relates to a cord protector and, more particularly, to a cord protector capable of preventing collision between combined rigid components to protect the combined rigid components and operating users, thereby increasing use safety.

Description of the Related Art

A "cord" is a kind of rope that can be resisted with a pull force, and the material of the cord is diversified. To pull a heavy weight, the cord can be made using steel wire and is called steel cable. Recently, applied chemistry is well developed, and synthetic resin material which resists pulling has been developed. The material is applied to produce the cord for replacing the steel cable. The cord made using synthetic resin is normally called synthetic cable and has the advantage of steel cable (pull resistance) (including being lightweight) without the defect of steel cable (including being difficult to wind while swinging). This cord has been gradually paid attention to and adopted. In the disclosure, the material of the "cord" can, but is not limited to, be steel cable, synthetic cable, etc.

The obvious instance of using the cord is a "power winch". The "power winch" is a hoist power appliance of hoisting up or laying down heavy weights and is also called a "hoist machine". Places of mounting the power winch include high storied buildings, heavy goods vertical lifting, or jeeps or all-terrain vehicles that drag other vehicles or are self-help moving (out of danger).

There are two types of disposing the cord on the power winch. The first type is shown in FIG. 1, with a side disposed with a power source 11 (a motor for example), and with its generated power transmitted by an internal shaft core to drive a deceleration device 12 disposed at a neighbor side or another side. The deceleration device 12 drives a cable pulley 13 for rotating after undergoing several levels of deceleration (planetary gear set for example) and transmission effect, so that the cord 14 wound on the cable pulley 13 can perform motion of a positive rotation discharging or counter revolution retracting. The cord 14 can be released or retracted through a discharging hole 151 on a discharging seat 15. The innermost end head of the cord 14 is combined with the cable pulley 13. When the cable pulley 13 rotates, the cord 14 can be wound on the cable pulley 13. The outermost end head of the cord 14 is stretched out of the discharging hole 151 of the discharging seat 15 and passes through a joining perforation 161 at a tail of a hook head 16 by way of fixedly connecting a collar 17, so that the hook head 16 locates at the front end of the cord 14. Therefore, while hoisting, the cord 14 is continuously stretched out the discharging hole 151, and the hook head 16 at the front end executes a hooking motion.

A second type is shown in FIG. 2. It still provides power through a power source 11, and a deceleration device 12 is driven through internal transmission and further drives a cable pulley 13 for rotating through several series of slow down to allow the cord 14 wound on the cable pulley 13 to perform motion of a positive rotation discharging or counter rotation retracting. After the outermost end head of the cord 14 also passes through a joining perforation 161 at a tail end of a hook head 16, it is fixedly connected by a collar 17. The difference between the second type (shown in FIG. 2) and the first type (shown in FIG. 1) is that the cord 14 in the second type is discharged or retracted by the discharging hole 181 at the middle of a four-way roller set 18.

As shown in FIGS. 1 and 2, the cord 14 can be stretched from the discharging hole 151 of the discharging seat 15 and can be stretched from the discharging hole 181 at the middle of the four-way roller set 18. Assembling the discharging seat 15 or the four-way roller set 18 on the power winch depends upon manufacture.

To look for rigidity, the discharging seat 15 or the four-way roller set 18 is made of metal material. For the same reason, the hook head 16 must also have rigidity since it is used for hoisting heavy weights. Therefore, the hook head 16 is also made of metal material. The cord 14 must resist pull to have flexibility and bending resistance. The cord 14 may be discharged by power while stretching out. The cord may also be pulled by labor force after turning off power. No matter how the cord 14 is discharged by any force, collision or impact phenomenon basically may not occur to have extremely low risk. When the cord 14 is retracted on the cable pulley 13 of the power winch, it must be pulled back at a certain speed through power. Finally, when the hook head 16 collides with the discharging seat 15 or the four-way roller set 18, power is stopped after sensing through the upper limit switch or the pressure switch inside the machine. In a motion of retracting the cord 14, the hook head 16 colliding with the discharging seat 15 or the four-way roller set 18 is taken for granted. In another word, collision is necessary to completely retract the cord 14.

The hook head 16 colliding with the discharging seat 15 or the four-way roller set 18 has the following shortcomings:

1. Each rigidity impact between the hook head 16 and the discharging seat 15 or between the hook head 16 and the four-way roller set 18 certainly has damage inside or on the surface. While reaching a critical point, and due to a minor impact, any one of the hook head 16, the discharging seat 15 or the four-way roller set 18 is damaged or broken requiring replacement, and a major impact industrial safety issue, such as load shedding, may occur due to damage of the hook head 16. In addition, any part may be damaged or may fall to harm persons. The foregoing accident may instantly happen and is difficult to take action in an early stage or in advance.

2. With the power winch disposed on the vehicle, the direct contact between the hook head 16 and the discharging seat 15 or between the hook head 16 and the four-way roller set 18 frequently generates a continuous noise of "kluck-kluck-kluck", thus affecting the emotion of persons in the vehicle to generate tenseness and restlessness. It does not only influence physical and mental health but also causes accidents.

The frequent rigid collision between the hook head 16 and the discharging seat 15 or between the hook head 16 and the four-way roller set 18 will affect each component's completeness of the power winch. Consequently, the mesh of internal gears of the power source 11 and/or the deceleration device 12 is not correct. Sometimes, the accuracy of the brake may be affected. The cord 14 may become loose, or assembling among components is not tight.

SUMMARY OF THE INVENTION

In view of the aforementioned drawbacks of the prior art, a protector in accordance with the present invention overcomes the drawbacks of the prior art.

Therefore, it is an objective of the present invention to provide a cord protector capable of preventing collision between combined rigid components to protect the combined rigid components and operating users, thereby increasing use safety.

To achieve the above mentioned objective, the present invention provides a cord protector composed of a first protection seat and a second protection seat, with the first protection seat and the second protection seat made of a flexible material resisting impact. An external side surface of the first protection seat is an arc cone shape having a narrow front and a wide rear condition, and an inner side of the first protection seat is a flattened shape. A bottom portion of an inner side of the flattened shape is an opening, and two end inner sides of the opening are respectively recessed to form a joining cavity. The opening is extended toward a top portion and expanded and divided by a cross bar to form two through grooves while reaching a top portion. Two ends of the inner side of the flattened shape are respectively opened with a joining through groove communicating toward outside. An external surface of the second protection seat is an arc cone having a narrow front and a wide rear condition, while an inner side is a flattened shape. A bottom portion of an inner side of the flattened shape of the second protection seat is an opening, with two end inner sides of the opening of the second protection seat respectively protruded to form a joining protrusion, and with two ends of an inner side of the flattened shape of the second protection seat respectively opened with a joining through groove communicating toward outside. The opening of the second protection seat corresponds to the opening of the first protection seat, with a position and a size of the joining protrusion of the second protection seat corresponding to the joining cavity of the first protection seat. The joining through groove of the second protection seat corresponds to the joining through groove of the first protection seat. While assembling, the flattened shape inner side of the second protection seat is pasted to the flattened shape inner side of the first protection seat to co-form a circle cone body having a narrow front and a wide rear condition, with the joining protrusion of the second protection seat exactly joined to enter the joining cavity of the first protection seat for staying one by one. The opening of the second protection seat and the opening of the first protection seat co-surround a circle opening. The cross bar of the first protection seat exactly leans against the flattened shape inner side of the second protection seat, with the joining through groove of the first protection seat correspondingly communicating with the joining through groove of the second protection seat. A male joining member joins a female joining member after passing through the joining through groove of the second protection seat and the joining through groove of the first protection seat.

In the above mentioned cord protector, an inner side wall surface of the through groove of the first protection seat is formed with an arc groove obliquely disposed; and the opening of the second protection seat is formed with a set of arc grooves obliquely disposed on a wall surface of the flattened shape inner side after extending a small section toward a top portion.

In the above mentioned cord protector, the arc groove of the second protection seat is symmetrical the arc groove of the first protection seat by spacing a distance.

In the above mentioned cord protector, a cross-section of the cross bar of the first protection seat is a triangular pyramid having a narrow inside and a wide outside condition.

In the above mentioned cord protector, the male joining member is a screw.

In the above mentioned cord protector, the female joining member is a nut.

The above mentioned cord protector is combined with a cord to protect the cord. An outermost end head of the cord is revolving and fixedly connected to the cord through a collar, and the opening of the first protection seat and the opening of the second protection seat co-clamp the cord. The cross bar of the first protection seat passes through a revolving combination place of the cord, with two side cord bodies of the revolving combination place of the cord respectively entering the two through grooves of the first protection seat.

In the above mentioned cord protector, the cord body of the cord is co-clamped by the arc groove of the first protection seat and the arc groove of the second protection seat.

DETAILED DESCRIPTION OF THE PREFERRED EMBODIMENTS

Figure 1:
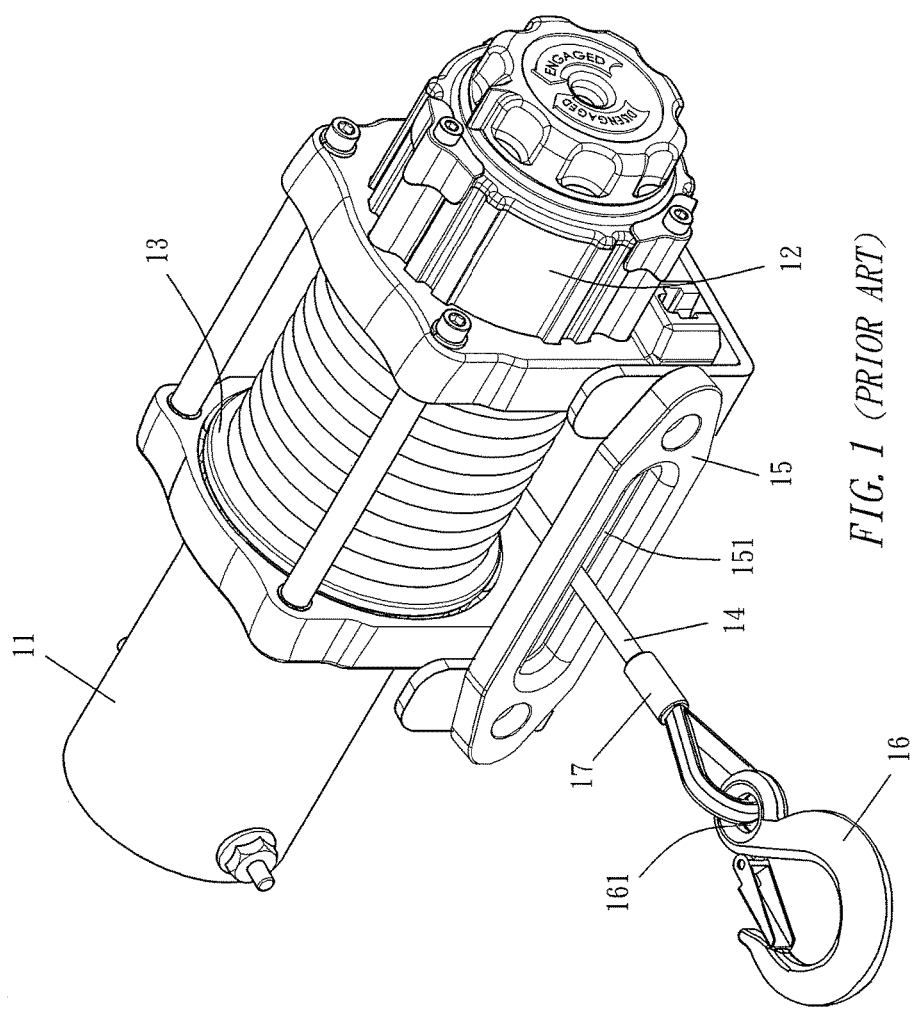
FIG. 1 is a three-dimensional drawing of installing a cord on a conventional power winch in accordance with a first type.

The technical characteristics, contents, advantages and effects of the present invention will be apparent with the detailed description of preferred embodiments accompanied with related drawings as follows.

With reference to FIGS. 3-7 for a cord protector 2 according to the embodiment of the present invention, the structure is formed by co-assembling a first protection seat 21 and a second protection seat 22. The first protection seat 21 and the second protection seat 22 are made of a flexible material that resists impact, such as synthetic rubber, rubber doped with synthetic resin, etc.. An external side surface of the first protection seat 21 is a circle arc cone having a narrow front and a wide rear condition, while an inner side is a flattened shape. A bottom of the flattened inner side is an opening 211. Two end inner sides of the opening 211 are respectively recessed to form a joining cavity 212. The opening 211 is extended toward the top portion and enlarged and, while reaching the top portion, is divided by a cross bar 213 to form two through grooves 214. The lateral cross-section of the cross bar 213 is a triangular pyramid having a narrow inside and a wide outside condition. An obliquely disposed arc groove 215 is formed on the inner side wall of each through groove 214. Two ends at the flattened inner side are respectively opened with a joining through groove 216 communicating toward the outside.

An external side surface of the second protection seat 22 is also a circle arc cone having a narrow front and a wide rear condition, while an inner side is also a flattened shape. A bottom of the flattened inner side is an opening 221. Two end inner sides of the opening 221 are respectively protruded to form joining protrusions 222. The opening 221 is formed with a set of arc grooves 225 obliquely disposed on the wall surface of the flattened inner side after extending a small section toward the top portion. Two ends of the flattened inner side are respectively disposed with a joining through groove 226 communicating toward the outside. The opening 221 of the second protection seat 22 corresponds to the opening 211 of the first protection seat 21. The position and size of the joining protrusion 222 of the second protection seat 22 corresponds to the joining cavity 212 of the first protection seat 21. The arc groove 225 of the second protection seat 22 is symmetric with the arc groove 215 of the first protection seat 21 by spacing an interval. The joining through groove 226 of the second protection seat 22 corresponds to the joining through groove 216 of the first protection seat 21.

Figure 5:
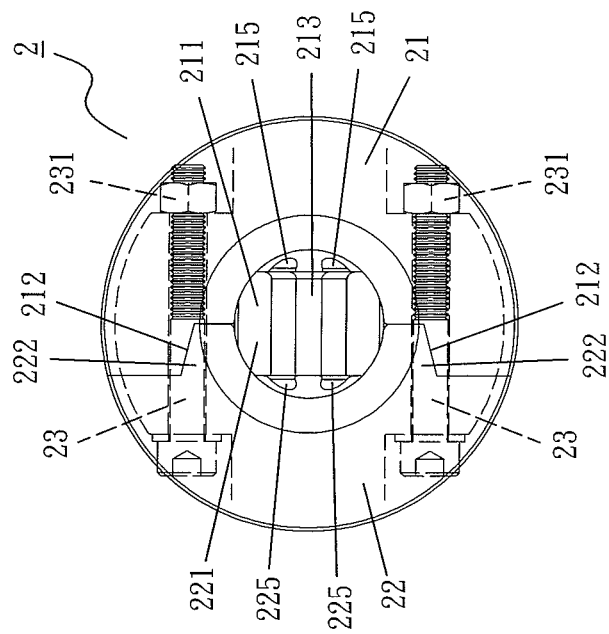
FIG. 5 is an assembled front view drawing according to the embodiment of the present invention.
Figure 6:
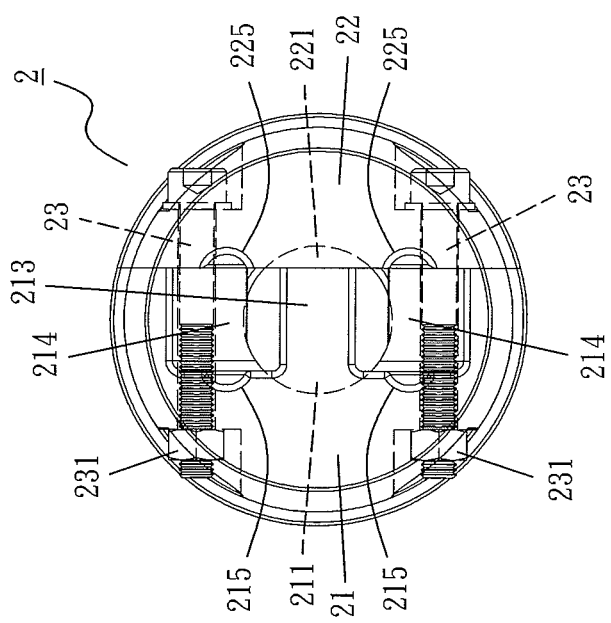
FIG. 6 is an assembled rear view drawing according to the embodiment of the present invention.
Figure 7:
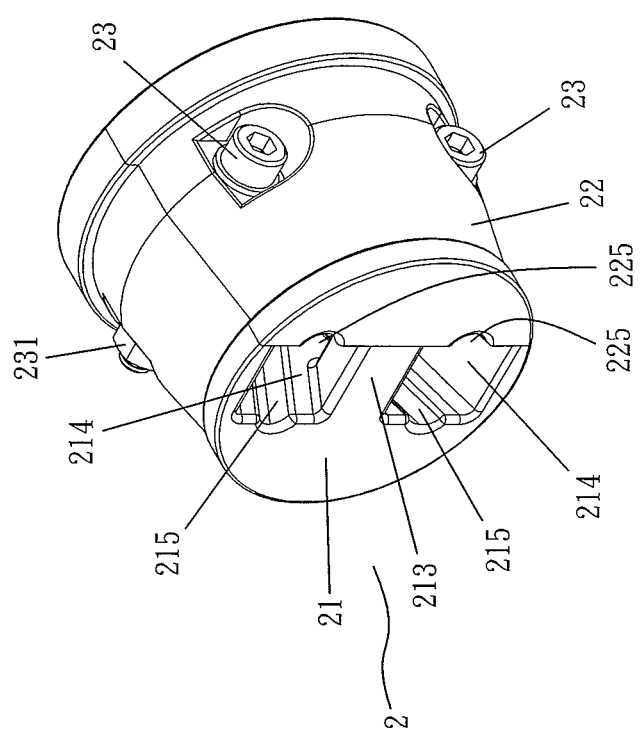
FIG. 7 is an assembled three-dimensional drawing according to the embodiment of the present invention.

While assembling, the flattened inner side of the second protection seat 22 is pasted to the flattened inner side of the first protection seat 21 to co-form a circle cone body having a narrow front and a wide rear condition as shown in FIGS. 5, 6 and 7. In the process, the joining protrusion 222 of the second protection seat 22, one by one, exactly enters in the joining cavity 212 of the first protection seat 21, and a circle opening is formed by co-surrounding the opening 221 of the second protection seat 22 and the opening 211 of the first protection seat 21 as shown in FIG. 6. At the same time, the cross bar 213 of the first protection seat 21 exactly leans against the flattened inner side of the second protection seat 22 as shown in FIG. 5. Moreover, the joining through groove 216 of the first protection seat 21 correspondingly penetrates through the joining through groove 226 of the second protection seat 22. Accordingly, a set of male joining members 23 (screws for example) is joined with a set of female joining members 231 (nuts for example) after passing through the joining through grooves 226, 216, so that the first protection seat 21 and the second protection seat 22 are assembled to form a complete cord protector 2.

Figure 8:
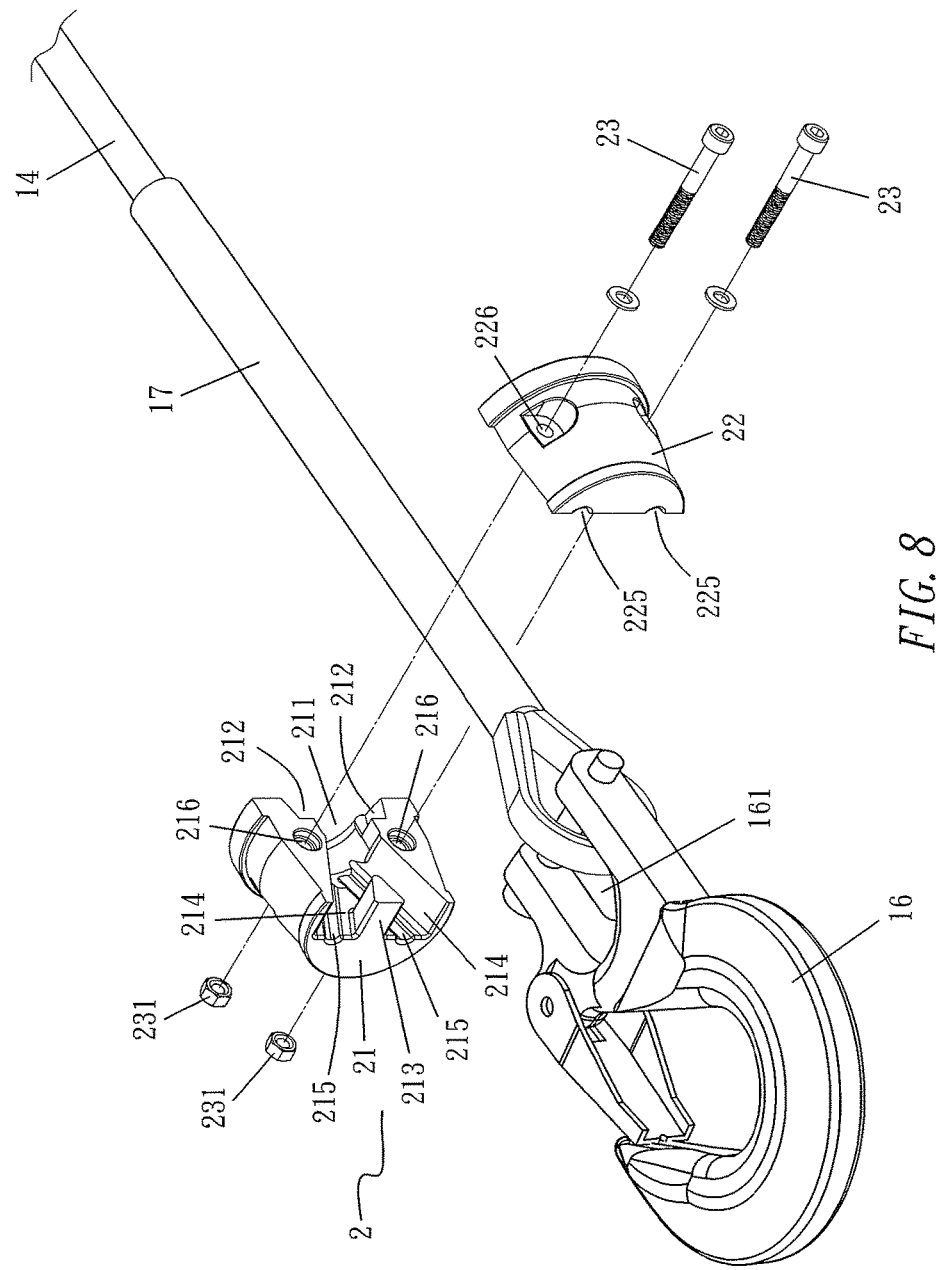
FIG. 8 is a decomposition chart of a cord and a hook head according to the embodiment of the present invention.
Figure 9:
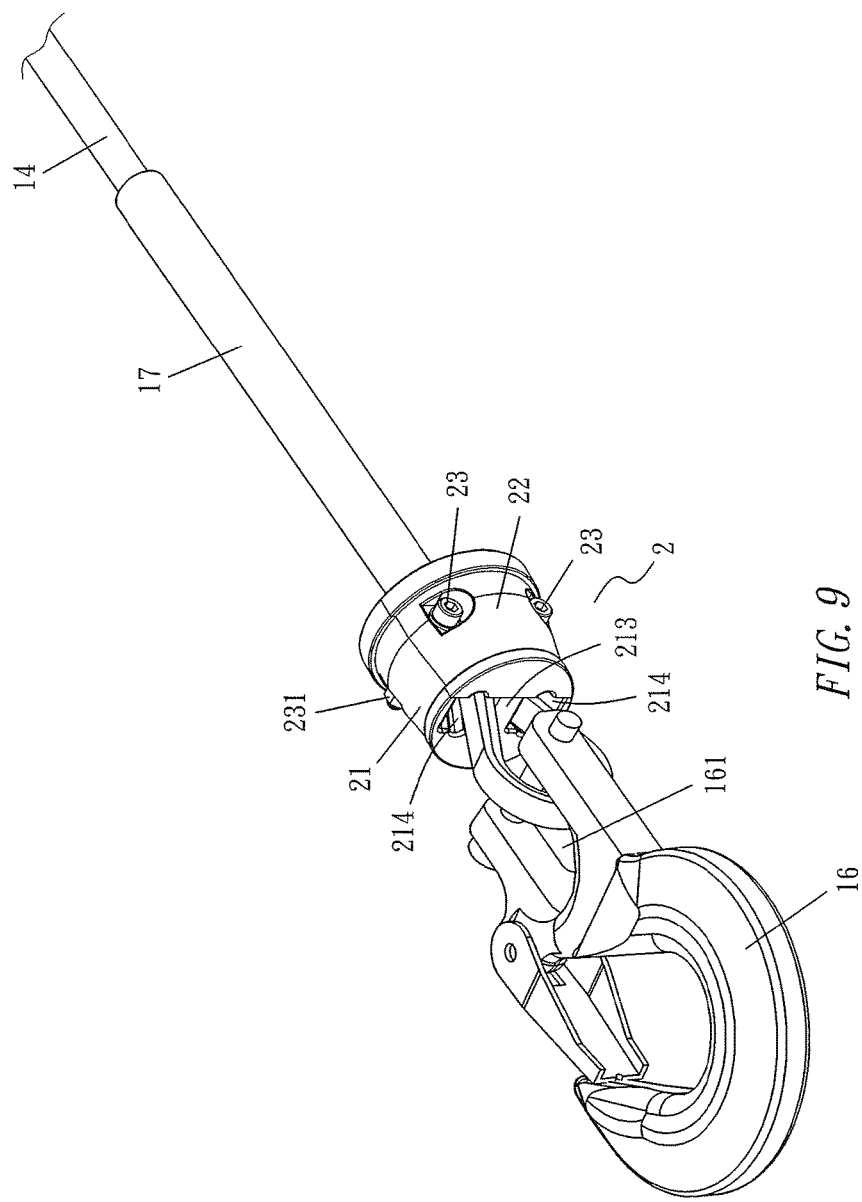
FIG. 9 is an assembled three-dimensional drawing of a cord and a hook head according to the embodiment of the present invention.

The cord protector 2 is specifically designed to combine with a cord 14 and to protect the cord 14. With reference to FIGS. 8 and 9, before the cord protector 2 is not joined with the female joining members 231 (nuts for examples) through the male joining members 23 (screws for example), the collar 17 outside the cord 14 can be co-clamped by the opening 211 of the first protection seat 21 and the opening 221 of the second protection seat 22. The outermost end head of the cord 14 revolves to fasten the cord 14 through the collar 17 after normally passing through a joining perforation 161 at the tail end of a hook head 16, and the hook head 16 is located at the front end of the cord 14. Accordingly, the opening 211 of the first protection seat 21 and the opening 221 of the second protection seat 22 exactly co-clamp the collar 17. At the same time, the cross bar 213 of the first protection seat 21 passes through a revolving combination place of the cord 14, so that cord bodies of the cord 14 at two sides respectively enter in the two through grooves 214 of the first protection seat 21 after revolving. If the cord body of the cord 14 is in a larger wide condition, it is co-supported and clamped by the arc groove 215 of the first protection seat 21 and the arc groove 225 of the second protection seat 22. After completing the motion of co-clamping the collar 17 through the first protection seat 21 and the second protection seat 22 and enabling the cross bar 213 of the first protection seat 21 passing through the revolving combination place of the cord 14, the male joining members 23 (screws for example) are joined with the female joining members 231 (nuts for example), such that the first protection seat 21 and the second protection seat 22 are not only assembled as the complete cord protector 2 but also combined with the cord 14 to protect the cord 14.

Figure 2:
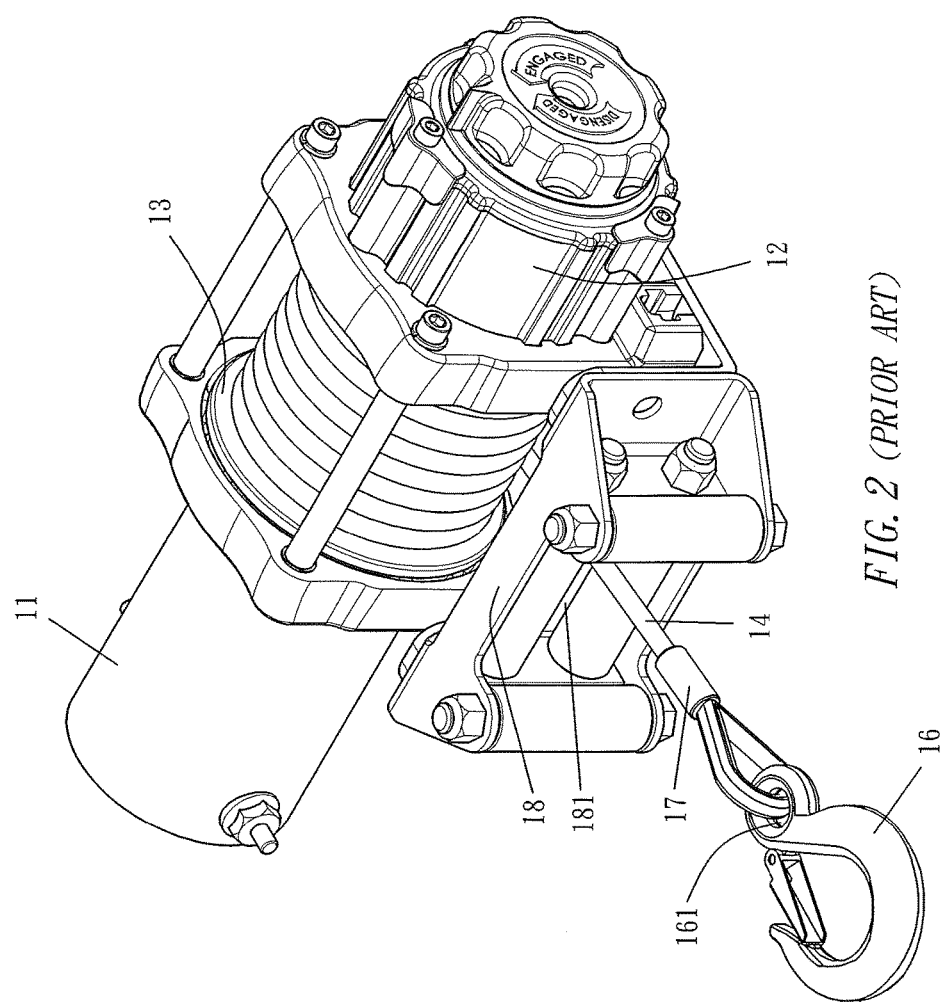
FIG. 2 is a three-dimensional drawing of installing cord on a conventional power winch in accordance with a second type.
Figure 3:
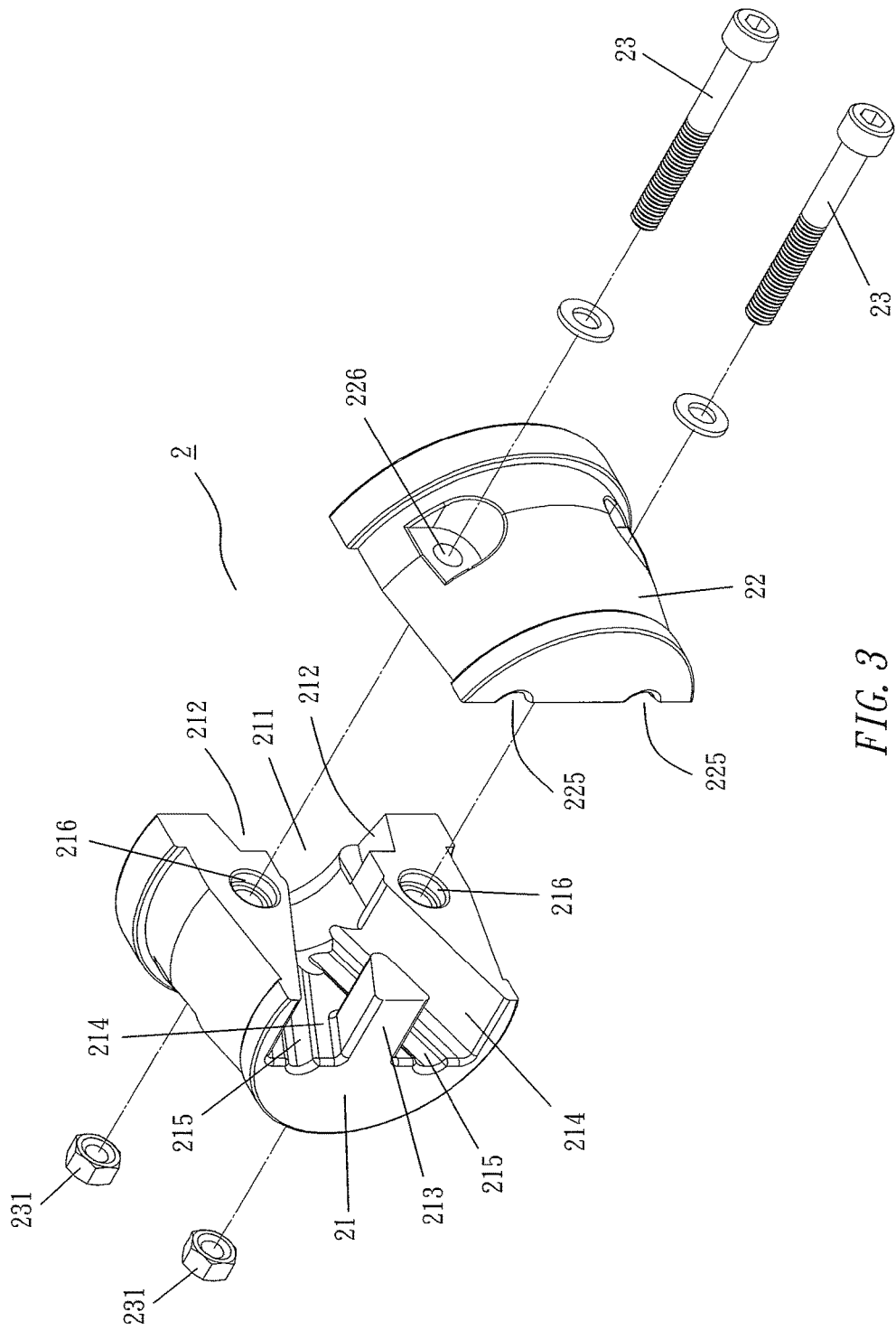
FIG. 3 is a three-dimensional decomposition chart at a front view angle according to the embodiment of the present invention.
Figure 4:
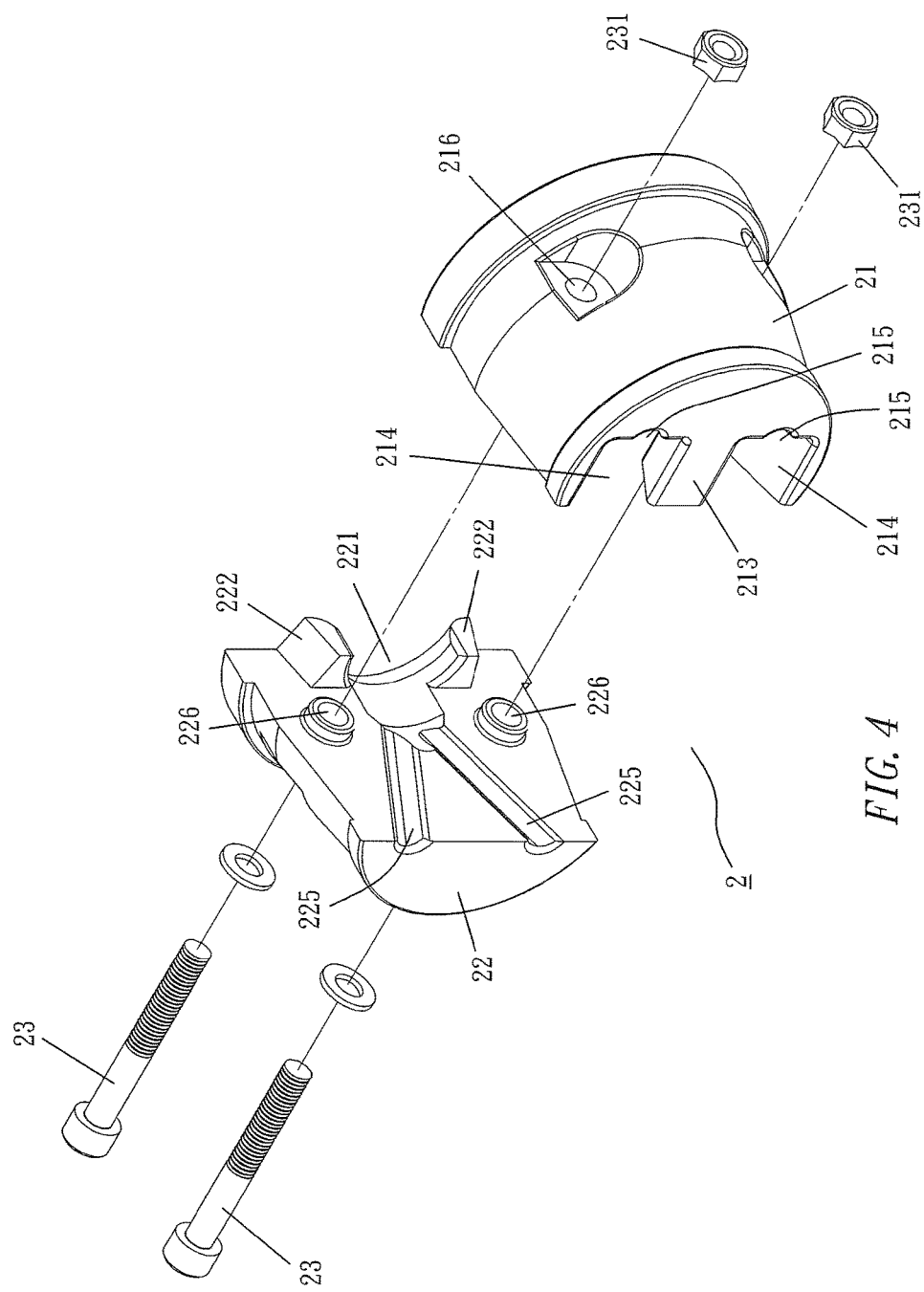
FIG. 4 is a three-dimensional decomposition chart at a rear view angle according to the embodiment of the present invention.
Figure 10:
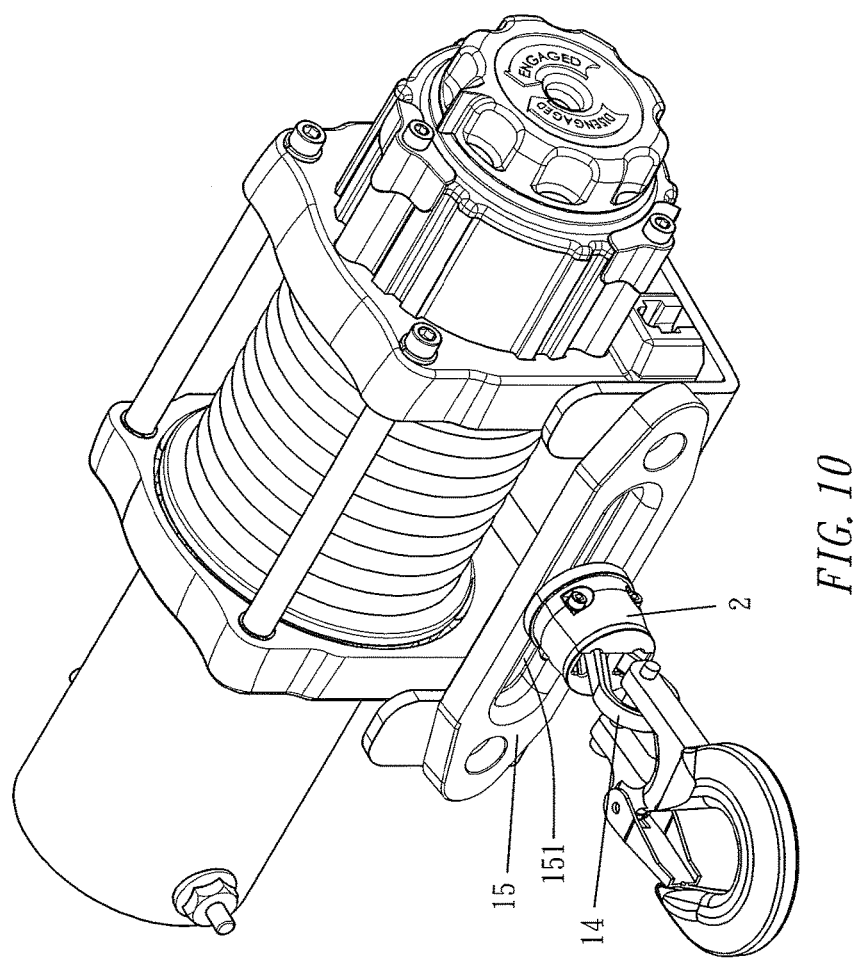
FIG. 10 is a three-dimensional drawing of installing on a power winch of a first type according to the embodiment of the present invention.
Figure 11:
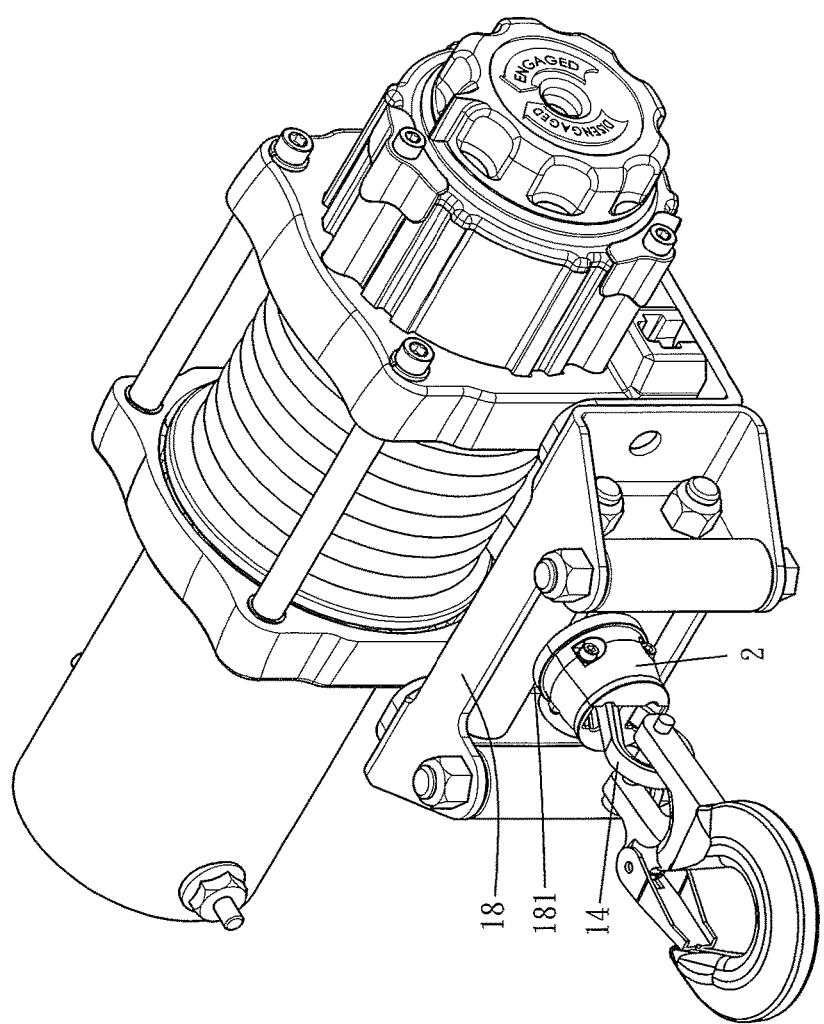
FIG. 11 is a three-dimensional drawing of installing on a power winch of a second type according to the embodiment of the present invention.

With references to FIGS. 8 and 9, the cord protector 2 disclosed by the invention is combined with the revolving combination place of the cord 14, and the outermost end of the cord 14 would pass through the joining perforation 161 at the tail end of a hook head 16 to achieve combination. The cord 14 is also combined on other appliances. Herein taking the cord 14 combined to the "power winch" as an example, by comparing with two types of installing cord on the conventional power winch shown in the foregoing FIGS. 1 and 2, with reference to FIGS. 10 and 11, FIG. 10 is in contrast with the foregoing FIG. 1. The cord 14 performs a motion of discharging or withdrawing via the cable entry 151 of a discharging seat 15. However, the revolving combination place of the cord 14 shown in FIG. 10 is further combined with the cord protector 2 disclosed in the invention. FIG. 11 is in contrast with the foregoing FIG. 2. The cord 14 carries out a motion of discharging or withdrawing via the cable entry 181 of a four-way roller set 18. The revolving combination place of the cord 14 shown in the FIG. 11 is also combined with the cord protector 2 disclosed in the invention.

With reference to FIGS. 10 and 11, after the revolving combination place of the cord 14 of the power winch is combined with the cord protector 2 disclosed by the invention, the cord protector 2 collides with the discharging seat 15 or the four-way roller set 18 when the cord 14 is withdrawn via power. Therefore, the loud noise generated from collision between metals in the prior art has been basically eliminated to have the following efficacies:

1. Since the cord protector 2 is made of flexible material resisting impact, every impact force on the discharging seat 15 or the four-way roller set 18 will be absorbed and buffered by the cord protector 2 to protect the hook head 16, the discharging seat 15 or the four-way roller set 18, so that an industrial safety issue can be prevented from occurring to protect the operator.

2. While retracting the cord 14, the cord protector 2 is fastened between the hook head 16 and the discharging seat 15 or between the hook head 16 and the four-way roller set 18 to avoid direct contact between metals. Therefore, it can eliminate generated noise during vehicle idling, such that the emotion of persons in the vehicle will not be influenced.

3. While retracting the cord 14, the cord protector 2 is fastened between the hook head 16 and the discharging seat 15 or between the hook head 16 and the four-way roller set 18 to avoid direct contact between metals. Therefore, it can protect completeness of each component of the power winch and operation accuracy.

The cord protector 2 disclosed by the present invention has a feature of preventing collision between combined rigid components to protect the combined rigid components and operating users to achieve progressive effect of use safety.

While the present invention has been described by means of specific embodiments, numerous modifications and variations could be made thereto by those skilled in the art without departing from the scope and spirit of the invention set forth in the claims.

What is claimed is:

1. A cord protector comprising a first protection seat and a second protection seat, with the first protection seat and the second protection seat made of a flexible material resisting impact, wherein an external side surface of the first protection seat is an arc cone shape having a narrow front and a wide rear, wherein an inner side of the first protection seat is a flattened shape, wherein a bottom portion of the inner side of the flattened shape is an opening, wherein two end inner sides of the opening are respectively recessed to form a joining cavity extending around and communicating with the opening, wherein the opening is extended toward but spaced from a top portion, with two through grooves obliquely extending from the opening to the top portion, with the two through grooves divided by a cross bar extending from the top portion towards but spaced from the opening, with the cross bar spaced from the joining cavity and the opening, wherein two ends of the inner side of the flattened shape are respectively opened with a joining through groove; with an external surface of the second protection seat being an arc cone having a narrow front and a wide rear, wherein an inner side of the second protection seat is a flattened shape, with a bottom portion of the inner side of the flattened shape of the second protection seat being an opening, wherein two end inner sides of the opening of the second protection seat respectively protrude to form first and second joining protrusions, with two ends of the inner side of the flattened shape of the second protection seat respectively opened with a joining through groove; with the opening of the second protection seat corresponding to the opening of the first protection seat, with the two joining protrusions of the second protection seat corresponding to the joining cavity of the first protection seat, with the joining through groove of the second protection seat corresponding to the joining through groove of the first protection seat; with the flattened shape of the second protection seat abutting the flattened shape of the first protection seat to co-form a circle cone body having a narrow front and a wide rear, with the two joining protrusions of the second protection seat entering the joining cavity of the first protection seat, with the opening of the second protection seat and the opening of the first protection seat defining a circle opening, with the cross bar of the first protection seat abutting against the flattened shape of the second protection seat, with the joining through groove of the first protection seat correspondingly communicating with the joining through groove of the second protection seat, and with a male joining member joined to a female joining member after passing through the joining through groove of the second protection seat and the joining through groove of the first protection seat.

2. The cord protector of claim 1, wherein inner side wall surfaces of the two through grooves of the first protection seat are formed with two arc grooves, with the two arc grooves being obliquely disposed; wherein the opening of the second protection seat is extended toward but spaced from a top portion of the second protection seat, with a set of arc grooves obliquely disposed on the flattened shape of the second protection seat and extending from the opening to the top portion of the second protection seat.

3. The cord protector of claim 2, wherein the set of arc grooves of the second protection seat is symmetrical with the arc grooves of the first protection seat by spacing a distance.

4. The cord protector of claim 1, wherein a cross-section of the cross bar of the first protection seat is a triangular pyramid having a narrow inside and a wide outside.

5. The cord protector of claim 1, wherein the male joining member is a screw.

6. The cord protector of claim 1, wherein the female joining member is a nut.

7. The cord protector of claim 1, further comprising a cord; and a collar revolving and fixedly connected to an outermost end head of the cord, wherein the opening of the first protection seat and the opening of the second protection seat co-clamp the cord, with the cross bar of the first protection seat passing through a revolving combination place of the cord, and with two side cord bodies of the revolving combination place of the cord respectively entering the two through grooves of the first protection seat.

8. The cord protector of claim 7, wherein the two side cord bodies of the cord are co-clamped by the two arc grooves of the first protection seat and the set of arc grooves of the second protection seat.

\* \* \* \* \*